US010177386B2

United States Patent
Lee et al.

(10) Patent No.: US 10,177,386 B2
(45) Date of Patent: Jan. 8, 2019

(54) POSITIVE ELECTRODE ACTIVE MATERIAL FOR SECONDARY BATTERY, AND SECONDARY BATTERY INCLUDING THE SAME

(71) Applicant: LG Chem, Ltd., Seoul (KR)

(72) Inventors: Dae Jin Lee, Daejeon (KR); Wang Mo Jung, Daejeon (KR); Seong Hoon Kang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/547,242

(22) PCT Filed: Nov. 23, 2016

(86) PCT No.: PCT/KR2016/013504
§ 371 (c)(1),
(2) Date: Jul. 28, 2017

(87) PCT Pub. No.: WO2017/095061
PCT Pub. Date: Jun. 8, 2017

(65) Prior Publication Data
US 2018/0019474 A1    Jan. 18, 2018

(30) Foreign Application Priority Data

Nov. 30, 2015 (KR) ........................ 10-2015-0169172

(51) Int. Cl.
*H01M 4/62* (2006.01)
*H01M 4/50* (2010.01)
(Continued)

(52) U.S. Cl.
CPC ............. *H01M 4/628* (2013.01); *C03C 3/087* (2013.01); *C03C 4/14* (2013.01); *C03C 8/02* (2013.01);
(Continued)

(58) Field of Classification Search
CPC ...... H01M 4/366; H01M 4/628; H01M 4/525; H01M 4/505; C03C 4/14; C03C 8/02; C03C 3/087
See application file for complete search history.

(56) References Cited

U.S. PATENT DOCUMENTS

| 2003/0082448 A1 | 5/2003 | Cho et al. |
| 2003/0148182 A1 | 8/2003 | Park et al. |

(Continued)

FOREIGN PATENT DOCUMENTS

| JP | 2004519082 A | 6/2004 |
| JP | 2009064732 A | 3/2009 |

(Continued)

OTHER PUBLICATIONS

Search report from International Application No. PCT/KR2016/013504, dated Feb. 21, 2017.

*Primary Examiner* — Matthew J Merkling
(74) *Attorney, Agent, or Firm* — Lerner, David, Littenberg, Krumholz & Mentlik, LLP (57) ABSTRACT

The present invention provides a positive electrode active material for a lithium secondary battery which is capable of preventing the degeneration of a positive electrode active material and the generation of a gas during operating a battery due to humidity, by including a surface treatment layer of an amorphous glass including an alkali metal oxide and an alkaline earth metal oxide on the surface of a core including a lithium composite metal oxide and by decreasing humidity reactivity, and a secondary battery including the same.

20 Claims, 3 Drawing Sheets

(51) Int. Cl.
*H01M 4/52* (2010.01)
*C03C 3/00* (2006.01)
*C03C 4/14* (2006.01)
*C03C 8/02* (2006.01)
*H01M 4/505* (2010.01)
*H01M 4/525* (2010.01)
*C03C 3/087* (2006.01)
*C03C 14/00* (2006.01)
*H01M 4/36* (2006.01)
*H01M 10/0525* (2010.01)
*H01M 4/02* (2006.01)

(52) U.S. Cl.
CPC ............ *C03C 14/004* (2013.01); *H01M 4/366* (2013.01); *H01M 4/505* (2013.01); *H01M 4/525* (2013.01); *H01M 10/0525* (2013.01); *C03C 2214/04* (2013.01); *C03C 2214/30* (2013.01); *H01M 2004/021* (2013.01); *H01M 2004/028* (2013.01)

(56) References Cited

U.S. PATENT DOCUMENTS

| | | |
|---|---|---|
| 2004/0200998 A1 | 10/2004 | Park et al. |
| 2006/0246352 A1* | 11/2006 | Kweon ............... C01G 45/1228 |
| | | 429/231.95 |
| 2011/0001094 A1 | 1/2011 | Hashiba et al. |
| 2014/0234718 A1 | 8/2014 | Lee et al. |
| 2016/0293951 A1 | 10/2016 | Lim et al. |
| 2016/0365607 A1* | 12/2016 | Yokoyama ............... C01G 45/12 |
| 2017/0222262 A1* | 8/2017 | Kim ................... H01M 10/0565 |

FOREIGN PATENT DOCUMENTS

| | | |
|---|---|---|
| JP | 2011014373 A | 1/2011 |
| JP | 5508322 B2 | 5/2014 |
| JP | 2015011943 A | 1/2015 |
| JP | 2015099722 A | 5/2015 |
| JP | 2015130273 A | 7/2015 |
| KR | 20020095421 A | 12/2002 |
| KR | 20030083476 A | 10/2003 |
| KR | 20130141772 A | 12/2013 |
| KR | 20150102405 A | 9/2015 |

* cited by examiner

POSITIVE ELECTRODE ACTIVE MATERIAL FOR SECONDARY BATTERY, AND SECONDARY BATTERY INCLUDING THE SAME

TECHNICAL FIELD

CROSS-REFERENCE TO RELATED APPLICATIONS

The present application is a national phase entry under § 371 of International Application No. PCT/KR2016/013504 filed Nov. 23, 2016, which claims priority from Korean Patent Application No. 10-2015-0169172, filed on Nov. 30, 2015, in the Korean Intellectual Property Office, the disclosures of which are hereby incorporated herein by reference.

TECHNICAL FIELD

The present invention relates to a positive electrode active material for a secondary battery in which the degeneration of a positive electrode active material and the generation of a gas during operating a battery due to humidity may be prevented, and a secondary battery including the same.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

However, there is a limitation of rapid reduction of life of the lithium secondary batteries as charge and discharge go on. The limitation is more serious for a battery with long life and a high voltage. The reason is that an electrolyte is decomposed or an active material is deteriorated due to humidity in a battery or other influence, and an increasing phenomenon of internal resistance of a battery is generated. Particularly, in the case of a positive electrode material, if the degeneration of the positive electrode material itself is worsen, the elution of constituent elements of the positive electrode active material increases, thereby rapidly degenerating battery life or disabling the use of a battery at a high voltage.

To solve the above-described limitations, methods for forming a surface treatment layer on the surface of a positive electrode active material have been suggested. Among them, in the case of an aluminum-based surface treatment layer of which stability at a high voltage and in an electrolyte is recognized, coating is applied on the surface of particles in a crystalline state, and uniform coating on the entire active material is difficult. In addition, due to the crystallinity of an aluminum-based compound itself, defects of increasing resistance occur. In addition, in the case of boron (B)-based coating material, uniform coating in an amorphous state is attained, and the transfer of lithium ions from a positive electrode material to an electrolyte is not inhibited. However, since borate-based glass reacts with humidity, a coating layer may not perform its role with the increase of reaction time with an electrolyte.

Accordingly, the development of a positive electrode active material which is capable of solving the above-described limitations and improving the performance of a lithium secondary battery is eagerly required.

DISCLOSURE OF THE INVENTION

Technical Problem

An aspect of the present invention is to provide a positive electrode active material for a secondary battery in which the degeneration of a positive electrode active material due to humidity and the generation of a gas during operating a battery may be prevented by the decrease of humidity reactivity, and a method of preparing the same.

Another aspect of the present invention is to provide a positive electrode for a secondary battery, a lithium secondary battery, a battery module, and a battery pack, including the positive electrode active material.

Technical Solution

To solve the tasks, according to an aspect of the present invention, there is provided a positive electrode active material for a lithium secondary battery including a core comprising a lithium composite metal oxide; and a surface treatment layer positioned on a surface of the core, wherein the surface treatment layer comprises an amorphous glass containing an alkali metal oxide and an alkaline earth metal oxide.

According to another aspect of the present invention, there is provided a method of preparing a positive electrode active material for a lithium secondary battery including a step of mixing a core comprising a lithium composite metal oxide with an amorphous glass comprising an alkali metal oxide and an alkaline earth metal oxide, and heat treating at a temperature of 500° C. or less.

According to another aspect of the present invention, there is provided a positive electrode, a lithium secondary battery, a battery module, and a battery pack including the above-described positive electrode active material.

Other particular aspects of embodiments of the present invention are included in the detailed description below.

Advantageous Effects

Since a surface treatment layer of an amorphous glass including an alkali metal oxide and an alkaline earth metal oxide is formed on the surface of a positive electrode active material for a secondary battery according to the present invention, humidity reactivity may decrease, and the degeneration of the positive electrode active material and the generation of a gas during operating a battery due to humidity may be prevented. In addition, the positive electrode active material may show excellent life characteristics and stability at a high voltage because of the improvement of the thermal and chemical stability thereof, and may be useful as a positive electrode active material of a battery for a high voltage of 4.4 V or more.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The positive electrode active material for a lithium secondary battery according to an embodiment of the present invention comprises:

a core comprising a lithium composite metal oxide, and a surface treatment layer positioned on the surface of the core, wherein the surface treatment layer comprises an amorphous glass comprising an alkali metal oxide and an alkaline earth metal oxide.

Generally, humidity which is come from hydroxide ions ($OH^-$) present in a positive electrode active material or an electrolyte accelerates the degeneration of a positive electrode and produces a large amount of gases during operating a battery.

In the present invention, a surface treatment layer of an amorphous glass which has excellent erosion resistance with respect to acid, base and humidity is formed on the surface of a core including a lithium transition metal compound in which reversible intercalation and deintercalation of lithium is possible, and direct contact of the core with an electrolyte is prevented, and therefore, the dissolution of a positive electrode active material in an electrolyte via the reaction with an electrolyte derived hydrofluoric acid may be prevented. As a result, the degeneration of a positive electrode and the generation of a gas during operating a battery may be prevented. In addition, by forming the surface treatment layer, a tapped density of a positive electrode active material may increase, and as a result, a rolling density may increase. In addition, the amorphous glass includes an alkali metal oxide and an alkaline earth metal oxide, and thus is stable at a high temperature of about 900 K. Accordingly, the positive electrode active material may be present stably against heat generated during operating a battery, and excellent life characteristics may be attained for a long time.

In particular, in the positive electrode active material for a lithium secondary battery according to an embodiment of the present invention, the amorphous glass may be a $R_2O$—$R'O$—$SiO_2$—$Al_2O_3$-based glass including an alkali metal oxide, an alkaline earth metal oxide, $SiO_2$ and $Al_2O_3$, i.e., an alkaline-earth aluminosilicate. In this case, R is an alkali metal, and R' is an alkaline earth metal.

Particularly in the amorphous glass, $SiO_2$ is a component forming a glass network with $Al_2O_3$ and plays the role of decreasing humidity reactivity of $H_2O$ which is produced in an electrolyte during operating a battery with $Al_2O_3$ in the surface treatment layer. However, if the amount of $SiO_2$ is excessively large, another phase which may not conduct lithium ions may be easily formed and as a result, conductivity in the surface treatment layer may decrease. If the amount is excessively small, vitrification may become difficult or a thermal expansion coefficient may become too large, thereby deteriorating the thermal stability of the surface treatment layer. Accordingly, $SiO_2$ may preferably be included by optimizing the amount thereof. Particularly, $SiO_2$ may be included in an amount of 30 to 80 wt %, more particularly, 60 to 75 wt % based on the total amount of the glass in the present invention.

In the amorphous glass, $Al_2O_3$ is a component increasing deformation point or Young's modulus and may be function as a forming agent of a network in glass. However, if the amount of $Al_2O_3$ is excessively large, the thermal expansion coefficient of glass is excessively decreased, and viscosity at a high temperature may be excessively increased. Accordingly, in the present invention, $Al_2O_3$ may be included in an amount of 1 to 30 wt %, more particularly, 5 to 15 wt % based on the total amount of the glass.

More particularly, in the amorphous glass, the alkaline-earth aluminosilicate may include $SiO_2$ and $Al_2O_3$ in amounts in each amount range such that the element molar ratio of Si/Al becomes 0.5 to 0.8.

In addition, in the amorphous glass, the alkali metal oxide ($R_2O$, where R is at least one alkali metal element such as Na and K) is a component which decreases viscosity at a high temperature and improves fusibility or moldability, and plays the role of a modifier when applied in a surface treatment layer and a messenger from a positive electrode to an electrolyte. Particularly, $Li_2O$ increases the conductivity of lithium ions and may improve the cycle properties of a battery via the reaction with hydrofluoric acid which is derived from an electrolyte during charge and discharge and the prevention of dissolution of a positive electrode active material in an electrolyte. However, if the amount of $R_2O$ in a glass composition is excessively large, a thermal expansion coefficient may be excessively increased, and thermal stability may be deteriorated. In addition, since $R_2O$ is fusible, an alkali metal may be eluted. Accordingly, in the present invention, $R_2O$ may be included in an amount of 1 to 30 parts by weight, more particularly, 10 to 25 parts by weight based on 100 parts by weight of the total weight of $SiO_2$ and $Al_2O_3$. $R_2O$ may particularly be $Li_2O$, $Na_2O$, or $K_2O$, and any one or a mixture of at least two thereof may be included.

In addition, in the amorphous glass, the alkaline earth metal oxide (R'O, where R' is at least one alkaline earth metal element such as Be, Mg, Ca, and Sr) is a component which decreases viscosity at a high temperature and improves fusibility or moldability, may particularly be BeO, MgO, CaO, and SrO, and may be included in an amount of 3 parts by weight or less, more particularly, 0.1 to 3 parts by weight based on 100 parts by weight of the total amount of $SiO_2$ and $Al_2O_3$.

More particularly, the alkaline-earth aluminosilicate may have a composition of $SiO_2$—$Al_2O_3$—$Na_2O$ CaO.

As described above, in the alkaline-earth aluminosilicate, CaO is partially substituted or added instead of $Na_2O$ in a $Na_2O$—CaO—$SiO_2$-based soda lime silicate glass, thereby increasing viscosity at a high temperature and improving structural stability of glass. In addition, by adding $Al_2O_3$ instead of a portion of SiO$_2$, the chemical resistance of glass may be further improved. Particularly, the alkaline-earth aluminosilicate may be a SiO$_2$—Al$_2$O$_3$—Na$_2$O—CaO-based glass including 30 to 80 wt % of SiO$_2$, 1 to 30 wt % of Al$_2$O$_3$, 1 to 20 wt % of Na$_2$O, and 5 to 30 wt % of CaO, and more particularly, 60 to 75 wt % of SiO$_2$, 5 to 20 wt % of Al$_2$O$_3$, 5 to 15 wt % of Na$_2$O, and 5 to 20 wt % of CaO.

More particularly, the alkaline-earth aluminosilicate may have a composition of SiO$_2$—Al$_2$O$_3$—Li$_2$OCaO.

As described above, in the alkaline-earth aluminosilicate, Li$_2$O is partially substituted or added instead of Na$_2$O in a Na$_2$O—CaO—SiO$_2$-based soda lime silicate glass, thereby improving lithium ion conductivity. In addition, by adding Al$_2$O$_3$ instead of a portion of SiO$_2$, the chemical resistance of glass may be further improved.

Particularly, the alkaline-earth aluminosilicate may be a SiO$_2$—Al$_2$O$_3$—Na$_2$O—CaO-based glass including 40 to 80 wt % of SiO$_2$, 1 to 30 wt % of Al$_2$O$_3$, 1 to 30 wt % of Li$_2$O, and 5 to 30 wt % of CaO, and more particularly, 50 to 70 wt % of SiO$_{2, 5}$ to 20 wt % of Al$_2$O$_3$, 5 to 20 wt % of Li$_2$O, and 5 to 20 wt % of CaO.

In addition, the amorphous glass may further include a ceramic oxide within the scope of not inhibiting its chemical and thermal stability. The ceramic oxide may further improve the lithium ion conductivity of the amorphous glass. A ceramic-based component may be included in an amount of 3 parts by weight or less, more particularly, 0.1 to 3 parts by weight based on 100 parts by weight of the total amount of Al$_2$O$_3$+SiO$_2$. The ceramic-based component may particularly be Y$_2$O$_3$, ZrO$_2$, or GeO$_2$.

The amorphous glass having the above-described composition may show lithium ion conductivity. Particularly, lithium ion conductivity of $10^{-6}$ S/cm or more at 25° C. may be shown.

Accordingly, resistance at the surface of an active material may decrease, and as a result, output characteristics may be improved.

In addition, the amorphous glass may have a softening temperature (Ts) of 1,100° C. to 1,300° C. If the softening temperature is less than 1,100° C., the formation of an amorphous oxide glass is difficult, and if the softening temperature is greater than 1,300° C., process difficulty and phase separation may arise.

The lithium ion conductivity and softening temperature may be attained by controlling the constituent components of the amorphous oxide glass and the amount ratio thereof.

In addition, the surface treatment layer including the amorphous glass may be formed on the entire surface or partially on the core. Particularly, if the surface treatment layer is partially formed, the surface area of 25% or more to less than 100% may be formed among the entire surface area of the core. If the surface area of the surface treatment layer is less than 25%, improving effect by the formation of the surface treatment layer may be insignificant. More particularly, the surface treatment layer may be formed for 25% to 99% of the surface area.

Meanwhile, if the surface treatment layer is partially formed, locally formed surface treatment layer on the surface of the core may be present in plural.

In addition, the surface treatment layer may be formed to an appropriate thickness in consideration of the particle diameter of a core, which determines the capacity of a positive electrode active material. Particularly, the surface treatment layer may be formed in an average thickness ratio to the radius of a core of 0.01 to 0.1. If the thickness ratio of the surface treatment layer is less than 0.01, improving effect according to the formation of a first surface treatment layer may be insignificant, and if the thickness ratio is greater than 0.1, resistance to lithium ions which pass through the first surface treatment layer may increase.

In the present invention, the particle diameter of the core and the thickness of the surface treatment layer may be measured by analyzing the cross-section of particles using a forced ion beam (fib).

Meanwhile, in the positive electrode active material, the core is a compound in which reversible intercalation and deintercalation of lithium is possible (lithiated intercalation compound), and particularly, may include a lithium composite metal compound including at least one metal such as cobalt, manganese, nickel and aluminum and lithium.

More particularly, the lithium composite metal oxide may include lithium-manganese-based oxides (for example, LiMnO$_2$, LiMn$_2$O, etc.), lithium-cobalt-based oxides (for example, LiCoO$_2$, etc.), lithium-nickel-based oxides (for example, LiNiO$_2$, etc.), lithium-nickel-manganese-based oxides (for example, LiNi$_{1-Y}$Mn$_Y$O$_2$ (where, 0<Y<1), LiMn$_{2-Z}$Ni$_Z$O$_4$ (where, 0<Z<2), etc.), lithium-nickel-cobalt-based oxides (for example, LiNi$_{1-Y}$Co$_Y$O$_2$ (where, 0<Y<1), etc.), lithium-manganese-cobalt-based oxides (for example, LiCo$_{1-Y}$Mn$_Y$O$_2$ (where, 0<Y<1), LiMn$_{2-Z}$Co$_Z$O$_4$ (where, 0<Z<2). etc.), lithium-nickel-manganese-cobalt-based oxides {for example, Li(Ni$_P$Co$_Q$Mn$_R$)O$_2$ (where, 0<P<1, 0<Q<1, 0<R<1, P+Q+R=1), Li(Ni$_P$Co$_Q$Mn$_R$)O$_4$ (where, 0<P<2, 0<Q<2, 0<R<2, P+Q+R=2), etc.), or lithium-nickel-cobalt-transition metal (M) oxides (for example, Li(Ni$_P$Co$_Q$Mn$_R$M$_S$)O$_2$ (where, M is selected from the group consisting of Al, Fe, V, Cr, Ti, Ta, Mg and Mo, P, Q, R and S are atomic fractions of each independent elements, 0<P<1, 0<Q<1, 0<R<1, 0<S<1, P+Q+R+S=1), etc.}, and a compound of any one or at least two thereof may be included. Among them, in terms of the increase of capacity characteristics and stability of a battery, the lithium composite metal oxide may be LiCoO$_2$, LiMnO$_2$, LiNiO$_2$, lithium nickel manganese cobalt oxides (for example, Li(Ni$_{0.6}$Mn$_{0.2}$Co$_{0.2}$)O$_2$, LiNi$_{0.5}$Mn$_{0.3}$Co$_{0.2}$O$_2$, LiNi$_{0.8}$Mn$_{0.1}$Co$_{0.1}$O$_2$, etc.), or lithium nickel cobalt aluminum oxides (for example, LiNi$_{0.8}$Co$_{0.15}$Al$_{0.05}$O$_2$, etc.). In terms of the remarkable improving effect according to the control of the kind and amount ratio of constituent elements forming a lithium composite metal oxide, the lithium composite metal oxide may be LiNi$_{0.6}$Mn$_{0.2}$Co$_{0.2}$O$_2$, LiNi$_{0.5}$Mn$_{0.3}$Co$_{0.2}$O$_2$, LiNi$_{0.7}$Mn$_{0.12}$Co$_{0.15}$O$_2$, LiNi$_{0.8}$Mn$_{0.2}$Co$_{0.2}$O$_2$, etc., and a compound of any one or at least two thereof may be used.

In addition, in the lithium composite metal oxide, at least one of metal elements other than lithium may be doped with any one or at least two elements selected from the group consisting of W, Mo, Zr, Ti, Mg, Ta, Al, Fe, V, Cr, Ba, Ca, and Nb. When a lithium deficient lithium composite metal oxide is doped with the metal elements as described above, the structural stability of the positive electrode active material may be improved, and as a result, the output characteristics of a battery may be improved. In this case, the amount of the elements doped in the lithium composite metal oxide may be appropriately controlled in the scope of not deteriorating the properties of the positive electrode active material, and may particularly be 0.02 atom % or less.

More particularly, in the positive electrode active material according to an embodiment of the present invention, the lithium composite metal oxide may include the compound of Formula 1 below.

[Formula 1]

(In Formula 1, M1 includes any one or at least two elements selected from the group consisting of Al and Mn, M2 includes any one or at least two elements selected from the group consisting of W, Mo, Zr, Ti, Mg, Ta, Al, Fe, V, Cr, Ba, Ca, and Nb, $1.0 \leq a \leq 1.5$, $0 < x \leq 0.5$, $0 < y \leq 0.5$, $0 < z \leq 0.02$, and $0 < x+y \leq 0.7$ may be satisfied, and more particularly, $1.0 \leq a \leq 1.2$, $0 < x \leq 0.5$, $0 < y \leq 0.5$, $0.0005 \leq z \leq 0.02$, and $0 < x+y \leq 0.7$ may be satisfied)

The core including the lithium composite metal oxide may be first particles, and may be composed of second particles which are agglomerates of the first particles. In this case, the first particles may be uniform or nonuniform.

In addition, when the core is the first particles or the second particles obtained by assembling the first particles of the lithium composite metal oxide, the core may have an average particle diameter ($D_{50}$) of 1 µm to 20 µm in consideration of the specific surface area of the positive electrode active material and the density of the positive electrode mixture material. If the average particle diameter of the positive electrode active material is less than 1 µm, dispersibility in the positive electrode mixture material may be deteriorated due to the agglomeration between positive electrode active materials, and if the average particle diameter is greater than 20 µm, the mechanical strength may be decreased and the specific surface area may be decreased in the positive electrode active material. In addition, the average particle diameter ($D_{50}$) may be 1 to 15 µm in consideration of the remarkable improving effect of battery rate capability and initial capacity properties according to the control of the particle size of the core. In addition, when the core is the second particles, the average particle diameter ($D_{50}$) of the first particles constituting the core may be from 50 nm to 1,000 nm.

In the present invention, the average particle diameter ($D_{50}$) of the positive electrode active material may be defined as a particle diameter at the 50% standard of a particle diameter distribution. In the present invention, the average particle diameter ($D_{50}$) of the positive electrode active material may be measured using, for example, a laser diffraction method. In particular, the average particle diameter ($D_{50}$) of the positive electrode active material may be obtained by dispersing the particles of the positive electrode active material in a dispersion medium, introducing thereof in a commercially available laser diffraction particle size measuring apparatus (for example, Microtrac MT 3000), irradiating ultrasonic waves of about 28 kHz with an output of 60 W, and computing the average particle diameter ($D_{50}$) at the 50% standard of the particle diameter distribution in a measuring apparatus.

The positive electrode active material according to an embodiment of the present invention, which has the above-described structure and configuration, may have an average particle diameter ($D_{50}$) of 1 µm to 20 µm, and a BET specific surface area of 0.1 m$^2$/g to 1.9 m$^2$/g.

If the average particle diameter ($D_{50}$) of the positive electrode active material is less than 1 µm, or the BET specific surface area is greater than 1.9 m$^2$/g, the dispersibility of the positive electrode active material in an active material layer may be deteriorated due to the agglomeration between positive electrode active materials and resistance in an electrode may increase. If the average particle diameter ($D_{50}$) of the positive electrode active material is greater than 20 µm, or the BET specific surface area is less than 0.1 m$^2$/g, the dispersibility of the positive electrode active material itself may be deteriorated and capacity may decrease. In addition, since the positive electrode active material according to an embodiment of the present invention satisfies average particle diameter and BET specific surface area conditions at the same time, excellent capacity and charge and discharge characteristics may be attained. More particularly, the positive electrode active material may have an average particle diameter ($D_{50}$) of 3 µm to 15 µm, and a BET specific surface area of 0.2 m$^2$/g to 1.5 m$^2$/g.

In the present invention, the average particle diameter ($D_{50}$) of the positive electrode active material may be defined and measured by the same method as the previous method for measuring the average particle diameter of the core. In addition, in the present invention, the specific surface area of the positive electrode active material is measured by a Brunauer-Emmett-Teller (BET) method, and may particularly be computed from a nitrogen gas absorption amount at a liquid nitrogen temperature (77 K) using BELSORP-mino II manufactured by BEL Co., in Japan.

In addition, the positive electrode active material according to an embodiment of the present invention may have a tapped density of 1.5 g/cc or more, or from 1.5 g/cc to 3.0 g/cc. With the high tapped density in the range, high capacity properties may be shown. More particularly, the tapped density may be from 1.7 g/cc to 2.5 g/cc. In the present invention, the tapped density of the positive electrode active material may be measured using a common measuring apparatus of a tapped density, and may particularly be measured using TAP-2S manufactured by LOGAN Co.

In addition, the positive electrode active material according to an embodiment of the present invention may be prepared by a preparation method including a step of mixing a core including a lithium composite metal oxide with an amorphous glass including an alkali metal oxide and an alkaline earth metal oxide, and heat treating at a temperature of 500° C. or less. Accordingly, a method of preparing a positive electrode active material is provided according to another embodiment of the present invention.

Particularly, the core including a lithium composite metal oxide and an amorphous glass used in the method of preparing a positive electrode active material are the same as explained above.

The amorphous glass may be prepared by heat treating an alkali-aluminosilicate and an alkaline earth metal oxide. Accordingly, the preparation method according to the present invention may further include a step of preparing an amorphous glass by heat treating an alkali-aluminosilicate and an alkaline earth metal oxide prior to the heat treating step.

In the preparation of the amorphous glass, the alkali-aluminosilicate may be a $R_2O$—$Al_2O_3$—$SiO_2$-based glass (where R is an alkali metal such as Li, Na, and K), and the amount thereof may be determined by the amount of each oxide in a finally prepared amorphous glass. In addition, the alkaline earth metal oxide reacting with the alkali-aluminosilicate may be R'O (where R' is an alkaline earth metal such as Be, Mg and Ca), and particularly, may be MgO or CaO. In addition, in the preparation of the amorphous glass, the mixing ratio of the alkali-aluminosilicate and the alkaline earth metal oxide may be determined by the amount of each oxide in a finally prepared amorphous glass.

In addition, when the amorphous glass further includes a ceramic-based oxide, a raw material including a ceramic element may be selectively further added during mixing the alkali-aluminosilicate and the alkaline earth metal oxide. In this case, the ceramic-based oxides which may be included in the amorphous oxide are the same as explained above.

In addition, in the preparation of the amorphous glass, heat treating temperature of the mixture of the alkali-aluminosilicate and the alkaline earth metal oxide may be from 500° C. to 1,300° C., and more particularly, from 700° C. to 900° C. If the heat treating temperature is less than 500° C., the production efficiency of the amorphous glass is low, and if the temperature is greater than 1,300° C., by-products may be produced.

Meanwhile, in the preparation method of the positive electrode active material, the mixing of the core and the amorphous glass may be performed by a common method. In this case, the mixing ratio of the amorphous glass to the core may be appropriately determined considering the thickness and amount of a surface treatment layer formed on the surface of a core.

In addition, the heat treating process after mixing the core and the amorphous glass may be performed at a temperature of 500° C. or less. Within the temperature range, an amorphous oxide glass may be easily formed. If the temperature during heat treating is greater than 500° C., by-products may be produced due to excessive sintering. More particularly, the heat treating process may be performed at a temperature of 120° C. to 350° C. In addition, the heat treating process may be performed by multi-steps in the temperature range. In this case, the heat treating may be performed by diversely changing the temperature in the process of each step.

In addition, an atmosphere during the heat treating is not specifically limited, and the heat treating may be performed in vacuum, in an inert atmosphere, or atmospheric conditions. In addition, the heat treating process may be performed for 5 hours to 24 hours, or 10 hours to 20 hours in the above-described conditions.

By the above-described preparation method, the positive electrode active material in which an amorphous glass including an alkali metal oxide and an alkaline earth metal oxide, particularly, a surface treatment layer including an alkaline earth-aluminosilicate is formed on the surface of a core including a lithium composite metal oxide, may be prepared. In addition, according to the preparation method of a positive electrode active material, a core and an amorphous glass are mixed in a solid phase and then, heat treated, and thus, there is no fear of generating by-products due to solvents used in a liquid phase mixing, and more uniform surface treatment layer may be formed.

In addition, according to another embodiment of the present invention, a positive electrode and a lithium secondary battery including the above-described positive electrode active material are provided.

Specifically, the positive electrode includes a positive electrode current collector, and a positive electrode active material layer formed on the positive electrode current collector and including the above-described positive electrode active material.

The positive electrode current collector is not specifically limited as long as it has conductivity without causing chemical changes in a battery, and, for example, stainless steel, aluminum, nickel, titanium, fired carbon, or aluminum or stainless steel that is surface-treated with one of carbon, nickel, titanium, silver, or the like may be used. Also, the positive electrode current collector may typically have a thickness of 3 μm to 500 μm, and microscopic irregularities may be formed on the surface of the current collector to improve the adhesion of the positive electrode active material. The positive electrode current collector may be used in various shapes such as a film, a sheet, a foil, a net, a porous body, a foamed body, a non-woven fabric body, and the like.

Also, the positive electrode active material layer may include a conductive agent and a binder in addition to the above-described positive electrode active material.

In this case, the conductive agent is used to impart the electrode with conductivity, wherein any conductive agent may be used without particular limitation as long as it has electron conductivity without causing chemical changes in a battery. Specific examples of the conductive agent may be graphite such as natural graphite and artificial graphite; carbon based materials such as carbon black, acetylene black, Ketjen black, channel black, furnace black, lamp black, thermal black, and carbon fibers; metal powders or metal fibers such as copper, nickel, aluminum, and silver; conductive whiskers such as zinc oxide whiskers and potassium titanate whiskers; conductive metal oxides such as titanium oxide; or conductive polymers such as polyphenylene derivatives, and any one or a mixture of at least two thereof may be used. The conductive agent may be typically included in an amount of 1 to 30 wt % based on the total weight of the positive electrode active material layer.

In addition, the binder plays the role of improving the adhesion between the positive electrode active material particles, and the adhesion between the positive electrode active material and the current collector. Specific examples of the binder may be polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one or a mixture of at least two thereof may be used. The binder may be included in an amount of 1 to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer including the above-described positive electrode active material and selectively, the binder and the conductive agent, is coated on the positive electrode current collector, dried and rolled to prepare the positive electrode. In this case, kinds and amounts of the positive electrode active material, the binder, and the conductive agent are the same as described previously.

The solvent may be a solvent normally used in the art. The solvent may include dimethyl sulfoxide (DMSO), isopropyl alcohol, N-methylpyrrolidone (NMP), acetone, or water, and any one or a mixture of at least two thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film obtained by separating from the support on the positive electrode current collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode current collector, and a negative electrode active material layer disposed on the negative electrode current collector.

The negative electrode current collector is not particularly limited as long as it has high conductivity without causing chemical changes in a battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode current collector may typically have a thickness of 3 to 500 μm, and, similar to the positive electrode current collector, microscopic irregularities may be formed on the surface of the current collector to improve the adhesion of a negative electrode active material. The negative electrode current collector may be used in various shapes such as a film, a sheet, a foil, a net, a porous body, a foamed body, a non-woven fabric body, and the like.

The negative electrode active material layer selectively includes a binder and a conductive agent in addition to the negative electrode active material. The negative electrode active material layer may be prepared by coating a composition for forming a negative electrode, which selectively includes the binder and the conductive agent as well as the negative electrode active material, on the negative electrode current collector and drying the coated negative electrode collector, or may be prepared by casting the composition for forming a negative electrode on a separate support and then laminating a film obtained by separating from the support on the negative electrode current collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_x$ ($0<x<2$), $SnO_2$, vanadium oxide, and lithium vanadium oxide; or a composite including the metallic compound and the carbonaceous material such as a Si—C composite and a Sn—C composite, and any one or a mixture of at least two thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be amorphous, plaste, flaky, spherical, or fibrous natural graphite or artificial graphite, Kish graphite, pyrolytic carbon, mesophase pitch-based carbon fibers, mesocarbon microbeads, mesophase pitches, and high-temperature sintered carbon such as petroleum or coal tar pitch derived cokes.

Also, the binder and the conductive agent may be the same as those previously described in the positive electrode.

Meanwhile, in a lithium secondary battery, a separator separates a negative electrode and a positive electrode and provides a movement path of lithium ions, wherein any separator may be used as the separator without particular limitation as long as it is used in a common lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of a battery may move. Specifically, ester-based solvents such as methyl acetate, ethyl acetate, Y-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; or carbonate-based solvents such as dimethyl carbonate (DMC), diethyl carbonate (DEC), methylethyl carbonate (MEC), ethylmethyl carbonate (EMC), ethylene carbonate (EC), and propylene carbonate (PC); alcohol-based solvents such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvents may preferably be used, and more preferably, a mixture of a cyclic carbonate (e.g., ethylene carbonate or propylene carbonate) having high ionic conductivity and high dielectric constant, which may increase charge and discharge performance of a battery, and a low-viscosity linear carbonate-based compound (e.g., ethylmethyl carbonate, dimethyl carbonate, or diethyl carbonate) may be used. In this case, the performance of an electrolyte may be excellent when the cyclic carbonate and the chain carbonate are mixed and used in a volume ratio of about 1:1 to about 1:9.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 to 2.0 M. In a case in which the concentration of the lithium salt is included within the above range, an electrolyte may have appropriate conductivity and viscosity, and thus, excellent performance of the electrolyte may be obtained and lithium ions may effectively move.

In order to improve life properties of a battery, to suppress the reduction in battery capacity, and to improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to an electrolyte in addition to electrolyte components. In this case, the additive may be included in an amount of 0.1 to 5 wt % based on the total weight of the electrolyte.

As described above, since a lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles.

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLE 1-1

Preparation of Positive Electrode Active Material 100 parts by weight of core particles ($D_{50}$=14 μm) including $LiNi_{0.6}Co_{0.2}Mn_{0.2}O_2$ and 0.5 parts by weight of an amorphous glass of $SiO_2$—$Al_2O_3$—$Na_2O$—$CaO$-based alkaline earth-aluminosilicate ($SiO_2$ content: 75 wt %, $Al_2O_3$ content: 7 wt %, $Na_2O$ content: 8 wt %, and CaO content: 10 wt %) were mixed in a solid phase in a reactor, and heated to 300 degrees centigrade to prepare a positive electrode active material (BET specific surface area=0.25 m$^2$/g, tapped density=2.43 g/cc), in which a surface treatment layer (average thickness=100 nm) including the amorphous glass of alkaline earth-aluminosilicate was formed on the core particles including $LiNi_{0.6}Co_{0.2}Mn_{0.2}O_2$.

EXAMPLE 1-2

Preparation of Positive Electrode Active Material 100 parts by weight of core particles ($D_{50}$=14 μm) including $LiNi_{0.6}Co_{0.2}Mn_{0.2}O_2$ and 0.3 parts by weight of an amorphous glass of $SiO_2$—$Al_2O_3$—$Na_2O$—$CaO$-based alkaline earth-aluminosilicate ($SiO_2$ content: 75 wt %, $Al_2O_3$ content: 7 wt %, $Na_2O$ content: 8 wt %, and CaO content: 10 wt %) were mixed in a solid phase in a reactor, and heated to 300 degrees centigrade to prepare a positive electrode active material (BET specific surface area=0.2 m$^2$/g, tapped density=2.5 g/cc), in which a surface treatment layer (average thickness=100 nm) including the amorphous glass of alkaline earth-aluminosilicate was formed on the core particles including $LiNi_{0.6}Co_{0.2}Mn_{0.2}O_2$.

EXAMPLE 1-3

Preparation of Positive Electrode Active Material 100 parts by weight of core particles ($D_{50}$=14 μm) including $LiNi_{0.6}Co_{0.2}Mn_{0.2}O_2$ and 0.5 parts by weight of an amorphous glass of $SiO_2$—$Al_2O_3$—$Li_2O$—$CaO$-based alkaline earth-aluminosilicate ($SiO_2$ content: 62 wt %, $Al_2O_3$ content: 8 wt %, $Li_2O$ content: 15 wt %, and CaO content: 15 wt %) were mixed in a solid phase in a reactor, and heated to 300 degrees centigrade to prepare a positive electrode active material (BET specific surface area=0.25 m$^2$/g, tapped density=2.4 g/cc), in which a surface treatment layer (average thickness=100 nm) including the amorphous glass of alkaline earth-aluminosilicate was formed on the core particles including $LiNi_{0.6}Co_{0.2}Mn_{0.2}O_2$.

EXAMPLE 1-4

Preparation of Positive Electrode Active Material

A positive electrode active material (BET specific surface area=0.2 m$^2$/g, tapped density=2.5 g/cc), in which a surface treatment layer (average thickness=100 nm) including an amorphous glass of alkaline earth-aluminosilicate was formed on the core particles including $LiNi_{0.6}Co_{0.2}Mn_{0.2}O_2W_{0.02}O_2$ by performing the same method as described in Example 1-1 except for using core particles ($D_{50}$=13 μm) including $LiNi_{0.6}Co_{0.2}Mn_{0.2}O_2W_{0.02}O_2$ instead of $LiNi_{0.6}Co_{0.2}Mn_{0.2}O_2$ in Example 1-1.

COMPARATIVE EXAMPLE 1-1

Preparation of Positive Electrode Active Material

A positive electrode active material (average thickness=100 nm) including an oxide layer including Si formed on the surface thereof was prepared by conducting the same method described in Example 1-1 except for using 0.5 parts by weight of a $SiO_2$ glass particles ($D_{50}$=300 nm) with respect to 100 parts by weight of core particles ($D_{50}$=13 μm) including $LiNi_{0.6}Co_{0.2}Mn_{0.2}O_2$.

EXAMPLES 2-1 TO 2-4, AND COMPARATIVE EXAMPLE 2-1

Manufacture of Lithium Secondary Batteries

Lithium secondary batteries were respectively manufactured by using the positive electrode active materials prepared in Examples 1-1 to 1-4, and Comparative Example 1-1.

Specifically, the positive electrode active materials respectively prepared in Examples 1-1 to 1-4, a carbon black conductive agent, and a PVdF binder were mixed in an N-methylpyrrolidone solvent in a weight ratio of 95:2.5:2.5 to prepare a composition for forming a positive electrode (viscosity: 5,000 mPa·s), and an aluminum current collector was coated with the composition, dried at 130° C., and rolled to prepared a positive electrode.

Also, natural graphite as a negative electrode active material, a carbon black conductive agent, and a PVdF binder were mixed in an N-methylpyrrolidone solvent in a weight ratio of 85:10:5 to prepare a composition for forming a negative electrode, and a copper current collector was coated with the composition to prepare a negative electrode.

Each lithium secondary battery was manufactured by manufacturing an electrode assembly by disposing a porous polyethylene separator between the positive electrode and the negative electrode prepared as above, disposing the electrode assembly in a case, and then injecting an electrolyte into the case. In this case, the electrolyte was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

EXPERIMENTAL EXAMPLE 1

Evaluation of Chemical Resistance of Glass Compositions

Chemical resistance of diverse glass compositions were evaluated and compared.

In detail, glass substrates with the compositions described in Table 1 below were prepared, and immersed in hydrochloric acid, sodium hydroxide and water at 95° C., and then, the occurrence of chemical corrosion was checked.

In this case, the change at the surface of the glass substrate was observed with a naked eye and evaluated according to the following standards.

<Evaluation Standards>
1: No change
2: Slight darkening
3: Generation of moderate degree of surface frost
4: Generation of intense surface frost and crack

TABLE 1

| Glass composition | 5% hydrochloric acid (24 hours immersion) | | 5% NaOH (6 hours) | | H$_2$O (24 hours) | |
| --- | --- | --- | --- | --- | --- | --- |
| | Weight loss (mg/cm$^2$) | Evaluation with naked eye | Weight loss (mg/cm$^2$) | Evaluation with naked eye | Weight loss (mg/cm$^2$) | Evaluation with naked eye |
| Soda lime silicate | 0.01 | 1 | 0.7 | 3 | 0.01 | 1 |
| Soda borosilicate | <0.01 | 1 | 1.5 | 3 | <0.01 | 1 |
| Barium aluminoborosilicate | 11 | 4 | 3 | 2 | 0.03 | 1 |
| Alkaline earth-boroaluminosilicate | 4 | 1 | 2 | 3 | 0.02 | 1 |
| Alkaline earth-aluminosilicate | <0.04 | 1 | 1 | 3 | <0.01 | 1 |

As suggested in the above table, the alkaline-earth aluminosilicate-based glass showed the most excellent chemical resistance among diverse oxide glasses against all hydrochloric acid, sodium hydroxide and water.

EXPERIMENTAL EXAMPLE 2

Observation of Surface Treatment Layer Formation

For the positive electrode active materials prepared in Examples 1-1 and 1-2 and Comparative Examples 1-1 and 1-2, the formation of a surface treatment layer and Si included in the surface treatment layer were confirmed using a transmission electron microscopy (TEM), and Si and Al were confirmed as the forming materials of the surface treatment layer using ICP. The results are shown in Table 2 below.

TABLE 2

| | Si (mg/kg) | Al (mg/kg) |
| --- | --- | --- |
| Example 1-1 | 125 | 600 |
| Example 1-2 | 165 | 650 |
| Comparative Example 1-1 | 1360 | <1.0 |

Figure 1:
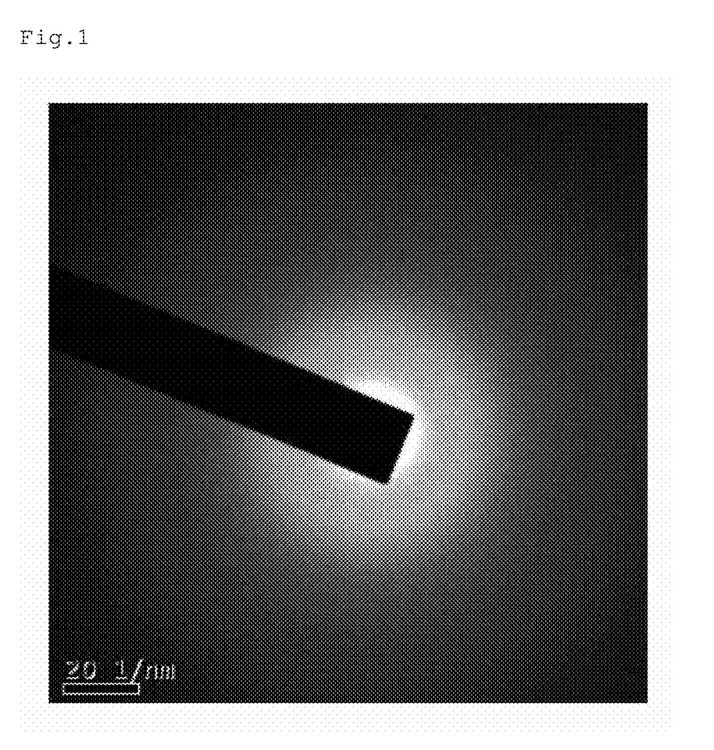
FIG. 1 illustrates X-ray diffraction (XRD) results of a surface treatment layer in Example 1-1.

In addition, in the positive electrode active material of Example 1-1, X-ray diffraction analysis was conducted with respect to a surface treatment layer, and the determination of a material forming a surface treatment layer was confirmed. The results are shown in FIG. 1.

From the experimental results, the material forming the surface treatment layer in the positive electrode active material was identified as an amorphous compound.

EXPERIMENTAL EXAMPLE 3

Evaluation of Positive Electrode Active Material

Coin cells (using a negative electrode of a Li metal) manufactured using the positive electrode active materials prepared in Examples 1-1 to 1-3, and Comparative Example 1-1 were charged with constant current (CC) of 0.1 C at 25° C. until 4.25 V, and charged with constant voltage (CV) of 4.25 V until charge current became 0.05 mAh to conduct first charge. Then, the coin cells were stood for 20 minutes, and discharged with constant current of 0.1 C until 3.0 V, and then, discharge capacity at the first cycle was measured. Then, discharge conditions were changed to 2 C, and charge/discharge capacity, charge and discharge efficiency, and rate capability were respectively evaluated. The results are shown in Table 3 below.

TABLE 3

| | First charge and discharge | | | 2 C rate | |
| --- | --- | --- | --- | --- | --- |
| | Charge capacity (mAh/g) | Discharge capacity (mAh/g) | Charge and discharge efficiency (%) | Capacity (mA/h/g) | 2.0 C/ 0.1 C (%) |
| Example 1-1 | 191.4 | 169.3 | 88.4 | 147.9 | 87.5 |
| Example 1-2 | 192.5 | 169.7 | 88.2 | 148.4 | 87.3 |
| Example 1-3 | 192.4 | 174.6 | 90.75 | 151.6 | 86.6 |
| Comparative Example 1-1 | 187.9 | 165.0 | 87.8 | 144.2 | 87.2 |

From the experimental results, the positive electrode active materials of Examples 1-1 to 1-3 showed excellent rate capability together with higher charge/discharge capacity, and charge and discharge efficiency properties when compared to those of Comparative Example 1-1.

EXPERIMENTAL EXAMPLE 4

Evaluation of Battery Properties of Lithium Secondary Batteries

The battery properties of lithium secondary batteries (Examples 2-1 to 2-3 and Comparative Example 2-1) including the positive electrode active materials of Examples 1-1 to 1-3 and Comparative Example 1-1 were evaluated.

In detail, the lithium secondary batteries were charged and discharged 400 times at a temperature of 45° C. under conditions of 1 C/2 C within a driving voltage range of 2.5 V to 4.15 V. Capacity retention, which was a ratio of discharge capacity at the 400$^{th}$ cycle to initial capacity, was measured after conducting charge and discharge 400 times. The results thereof are presented in FIG. 2.

Figure 2:
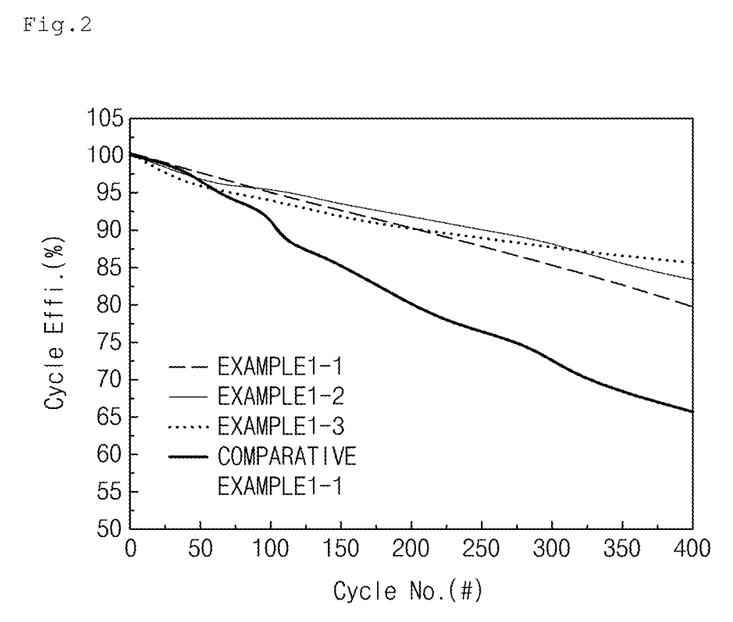
FIG. 2 is a graph illustrating evaluation results of life characteristics for batteries including positive electrode active materials of Examples 1-1 to 1-3, and Comparative Example 1.

From the experimental results, the batteries including the positive electrode active materials of Examples 1-1 to 1-3 showed about 80% or more of capacity retention after 400 cycles, and showed markedly improved life properties when compared to the battery including the positive electrode active material of Comparative Example 1-1, which showed about 65% degree of capacity retention after 400 cycles.

Figure 3:
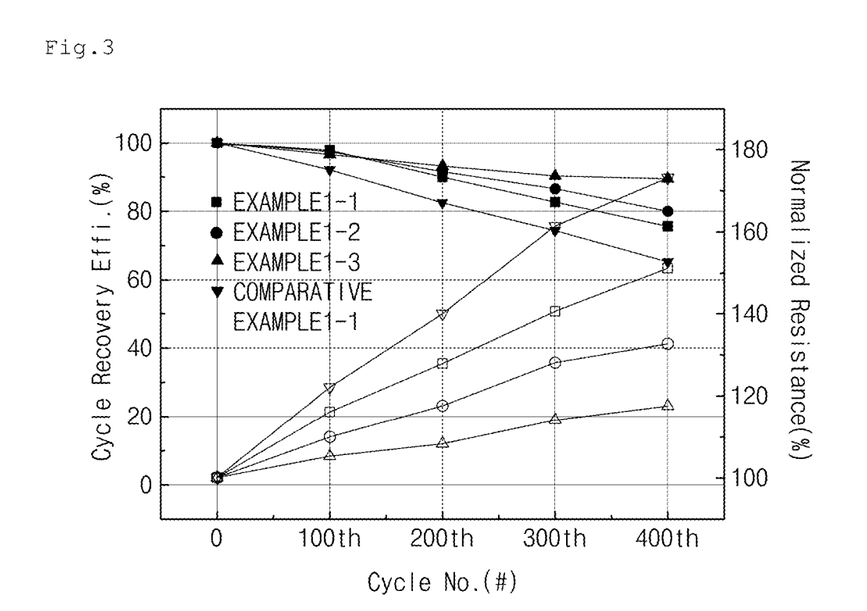
FIG. 3 is a graph illustrating evaluation results of resistance properties for batteries including positive electrode active materials of Examples 1-1 to 1-3, and Comparative Example 1.

In addition, in order to evaluate output characteristics, a battery charged and discharged at room temperature (25° C.) was charged based on SOC 50%, and the resistance thereof was measured. The results are shown in FIG. 3.

From the experimental results, the resistance of the battery including the positive electrode active material of Comparative Example 1-1 was rapidly increased according to the increase of cycle number. In contrast, the resistance increase width of batteries including the positive electrode active materials of Examples 1-1 to 1-3 was markedly reduced when compared to that of Comparative Example 1-1.

From the results, it is found that the positive electrode active material according to the present invention showed better improving effects of output characteristics of a battery.

EXPERIMENTAL EXAMPLE 5

Measurement of Gas Generation Amount of Lithium Secondary Batteries

The generation amount of an oxygen gas was measured after charging lithium secondary batteries (Examples 2-1 to 2-3 and Comparative Example 2-1) including the positive electrode active materials of Examples 1-1 to 1-3 and Comparative Example 1-1 with constant current of 0.1 C until 4.6 V under conditions of 25° C. and 50% humidity.

In detail, a battery was sunk in paraffin on the market, and the amount of an oxygen gas (volume) generated was measured from the difference of liquid surfaces before and after charge and discharge. A laminated battery was opened first and vacuum sealed. Then, gas in the laminate was removed, and discharge with 0.1 C was performed until an end voltage of 2.0 V during discharge, and discharge capacity at the first cycle (initial discharge capacity) was measured. The results are shown in Table 4 below.

TABLE 4

| | Gas generation amount (ml) | Initial discharge capacity (mAh/g) |
|---|---|---|
| Example 2-1 | 151 | 169.3 |
| Example 2-2 | 166 | 169.7 |
| Example 2-3 | 134 | 174.6 |
| Comparative Example 2-1 | 512 | 165.0 |

From the experimental results, the lithium secondary batteries of Examples 2-1 to 2-3, including the positive electrode active materials of Examples 1-1 to 1-3 showed the initial discharge capacity of the same degree as the lithium secondary battery including the positive electrode active material of Comparative Example 1-1 and markedly decreased generation amount of a gas.

The invention claimed is:

1. A positive electrode active material for a lithium secondary battery, the positive electrode active material comprising:
   a core comprising a lithium composite metal oxide; and
   a surface treatment layer positioned on a surface of the core,
   wherein the surface treatment layer comprises an amorphous glass containing an alkali metal oxide and an alkaline earth metal oxide.

2. The positive electrode active material for a lithium secondary battery of claim 1, wherein the amorphous glass is an alkaline-earth aluminosilicate comprising the alkali metal oxide, the alkaline earth metal oxide, $SiO_2$, and $Al_2O_3$.

3. The positive electrode active material for a lithium secondary battery of claim 2, wherein the alkaline-earth aluminosilicate comprises 1 to 30 parts by weight of the alkali metal oxide and 1 to 30 parts by weight of the alkaline earth metal oxide based on 100 parts by weight of a total amount of $SiO_2$ and $Al_2O_3$.

4. The positive electrode active material for a lithium secondary battery of claim 2, wherein the alkaline-earth aluminosilicate comprises at least one selected from the group consisting of a $SiO_2$—$Al_2O_3$—$Na_2O$—$CaO$-based glass and a $SiO_2$—$Al_2O_3$—$Li_2O$—$CaO$-based glass.

5. The positive electrode active material for a lithium secondary battery of claim 1, wherein the surface treatment layer comprises the amorphous glass comprising the alkali metal oxide and the alkaline earth metal oxide, the amorphous glass showing lithium ion conductivity of $10^{-6}$ S/cm or more at 25° C.

6. The positive electrode active material for a lithium secondary battery of claim 1, wherein the surface treatment layer is formed on a surface area of 25% or more and less than 100% among an entire surface area of the core.

7. The positive electrode active material for a lithium secondary battery of claim 1, wherein the surface treatment layer is formed in an average thickness ratio of 0.01 to 0.1 with respect to a radius of the core.

8. The positive electrode active material for a lithium secondary battery of claim 1, wherein the core comprises a lithium nickel manganese cobalt oxide.

9. The positive electrode active material for a lithium secondary battery of claim 8, wherein the lithium nickel manganese cobalt oxide is doped with any one or at least two elements selected from the group consisting of W, Mo, Zr, Ti, Mg, Ta, Al, Fe, V, Cr, Ba, Ca, and Nb.

10. The positive electrode active material for a lithium secondary battery of claim 1, wherein the core is secondary particles which are obtained by assembling first particles.

11. The positive electrode active material for a lithium secondary battery of claim 1, wherein the core has an average particle diameter ($D_{50}$) of 1 μm to 20 μm.

12. The positive electrode active material for a lithium secondary battery of claim 1, wherein a BET specific surface area is from 0.1 m²/g to 1.9 m²/g, and a tapped density is 1.5 g/cc or more.

13. A method of preparing the positive electrode active material for a lithium secondary battery according to claim 1, the method comprising a step of mixing a core comprising a lithium composite metal oxide with an amorphous glass comprising an alkali metal oxide and an alkaline earth metal oxide, and heat treating at a temperature of 500° C. or less.

14. The method of preparing the positive electrode active material for a lithium secondary battery of claim 13, further comprising a step of preparing the amorphous glass comprising the alkali metal oxide and the alkaline earth metal oxide by heat treating an alkali-aluminosilicate and the alkaline earth metal oxide prior to the step of mixing and heat treating.

15. A positive electrode for a secondary battery, comprising the positive electrode active material according to claim 1.

16. A lithium secondary battery comprising the positive electrode according to claim 15.

17. A battery module comprising the lithium secondary battery according to claim 16 as a unit cell.

18. A battery pack comprising the battery module according to claim 17.

19. The battery pack of claim 18, wherein the battery pack is used as a power source of a medium and large size device.

20. The battery pack of claim 19, wherein the medium and large size device is selected from the group consisting of an electric vehicle, a hybrid electric vehicle, a plug-in hybrid electric vehicle and a power storage system.

* * * * *